Nov. 9, 1926.  
W. U. G. RAYL  
1,606,665  
ANTIFRICTION DEVICE FOR LEAF SPRINGS  
Filed Sept. 5, 1925
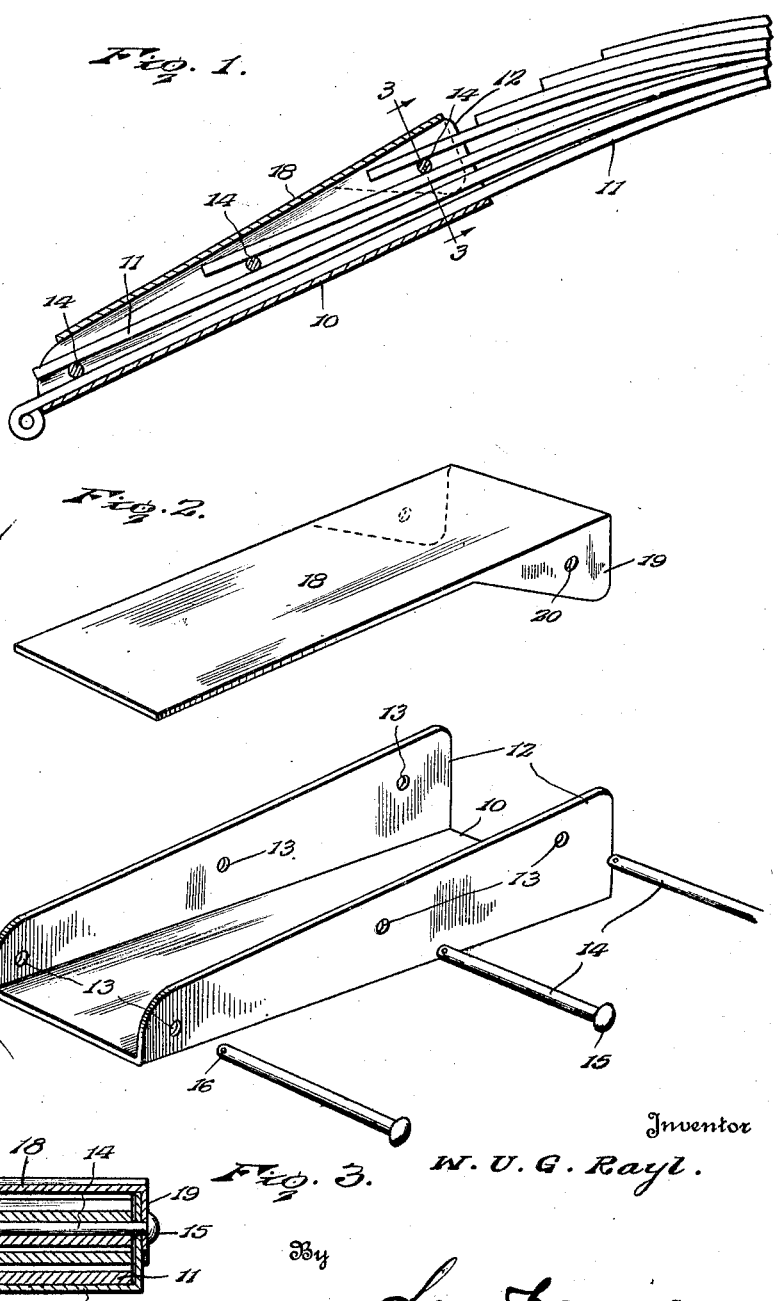
Inventor  
W. U. G. Rayl.  
By Lacy & Lacy, Attorneys Patented Nov. 9, 1926.

1,606,665

UNITED STATES PATENT OFFICE.

WILLIAM U. G. RAYL, OF JOPLIN, MISSOURI.

ANTIFRICTION DEVICE FOR LEAF SPRINGS.

Application filed September 5, 1925. Serial No. 54,735.

This invention relates to an improved anti-friction device for leaf springs, being more particularly designed for use in connection with the springs of Ford vehicles, and seeks, among other objects, to provide a device of this character which will materially lessen the mutual frictional drag of the end portions of the leaves of a spring, to thereby facilitate the action of the spring and relieve shock.

The invention seeks, as a further object, to provide a device which will not only serve as a clip for the ends of the spring leaves but will also serve to house the ends of the leaves for excluding the weather and reducing rust.

And the invention seeks, as a still further object, to provide a device which will be simple in its construction, inexpensive to manufacture, and which may be easily applied.

Other and incidental objects will appear hereinafter.

In the accompanying drawings:

Figure 1 is a sectional view showing my improved device applied to a conventional leaf spring.

Figure 2 is a detail perspective view of the device, the parts being disassembled but in proper relative position.

Figure 3 is a transverse sectional view on the line 3—3 of Figure 1, looking in the direction indicated by the arrows.

In carrying the invention into effect, I employ a channel-shaped bottom plate 10 which, as shown in Figure 1, is shaped to fit the end portion of a leaf spring, conventionally illustrated at 11, embracing the end portions of the longer of the spring leaves. The bottom plate may be of suitable resilient sheet metal and the side flanges 12 thereof are, as particularly shown in Figure 2, tapered from the inner end of the plate to the outer end thereof. Formed in said side flanges are spaced pairs of alined openings 13 and journaled through said pairs of openings to extend between the end portions of the longer leaves of the spring are rollers 14. These rollers thus serve to secure the bottom plate 10 in position upon the spring and, as particularly shown in Figure 2, said rollers are provided at corresponding ends thereof with heads 15 while near their opposite ends, the rollers are provided with openings 16 to receive cotter keys or like fastening devices 17 securing the rollers against endwise displacement. Overlying the upper edges of the side flanges 12 of the bottom plate 10 is a top plate 18 cooperating with the bottom plate to form a housing enclosing the ends of the spring leaves for excluding the weather. At its inner end, the top plate 18 is provided with depending ears 19 straddling the inner ends of the side flanges 12 of the bottom plate and, as particularly shown in Figure 2 of the drawings, said ears are formed with alined openings 20 to receive the innermost of the rollers 14 so that this roller thus serves to connect the top plate with the bottom plate and secure the top plate in position.

As will now be seen in view of the foregoing, when the spring is flexed, the rollers 14 will turn between the end portions of the spring leaves to facilitate the flexing of the spring so that the spring will more readily respond. Furthermore, due to the quickened action of the spring, shock will be relieved. I thus provide a particularly simple and effective device for the purpose set forth and, as will be appreciated, a device which may be readily produced and easily applied.

Having thus described the invention, what I claim is:

1. An anti-friction device for leaf springs including a channel-shaped bottom plate having side flanges, rollers journaled through said flanges and removable endwise therefrom, and removable means securing the rollers against endwise displacement.

2. An anti-friction device for leaf springs including a channel-shaped bottom plate having side flanges, a top plate pivoted adjacent one end to the flanges of said bottom plate and cooperating with the bottom plate to form a housing, and rollers journaled through the side flanges of the bottom plate.

3. An anti-friction device for leaf springs including a channel-shaped bottom plate having side flanges, a top plate cooperating with the bottom plate to form a housing, and rollers journaled through the side flanges of the bottom plate, one of said rollers connecting the top plate with the bottom plate.

4. An anti-friction device for leaf springs including a channel-shaped bottom plate having upstanding side flanges, a top plate having depending lugs adjacent one end straddling the side flanges of the bottom plate, the top plate cooperating with the bottom plate to form a housing, and rollers journaled through said side flanges and adapted to fit between leaves of a spring, one of the rollers extending through said ears to pivotally connect the top plate with the bottom plate.

5. An anti-friction device for leaf springs including a channel-shaped bottom plate having upstanding side flanges tapered toward the outer end of the plate, a top plate overlying the upper edges of said side flanges and cooperating with the bottom plate to form a housing, the top plate being provided at one end thereof with depending ears straddling the inner ends of the side flanges of the bottom plate, and rollers journaled through said side flanges, one of the rollers extending through said ears to pivotally connect the top plate with the bottom plate.

In testimony whereof I affix my signature.

WILLIAM U. G. RAYL. [L. S.]